No. 721,954. PATENTED MAR. 3, 1903.
H. L. HUET & A. DAUBRESSE.
APPARATUS FOR TAKING PICTURES AND VIEWING OR REPRODUCING ANIMATED SCENES THEREFROM.
APPLICATION FILED MAY 18, 1900.
NO MODEL. 5 SHEETS—SHEET 1.
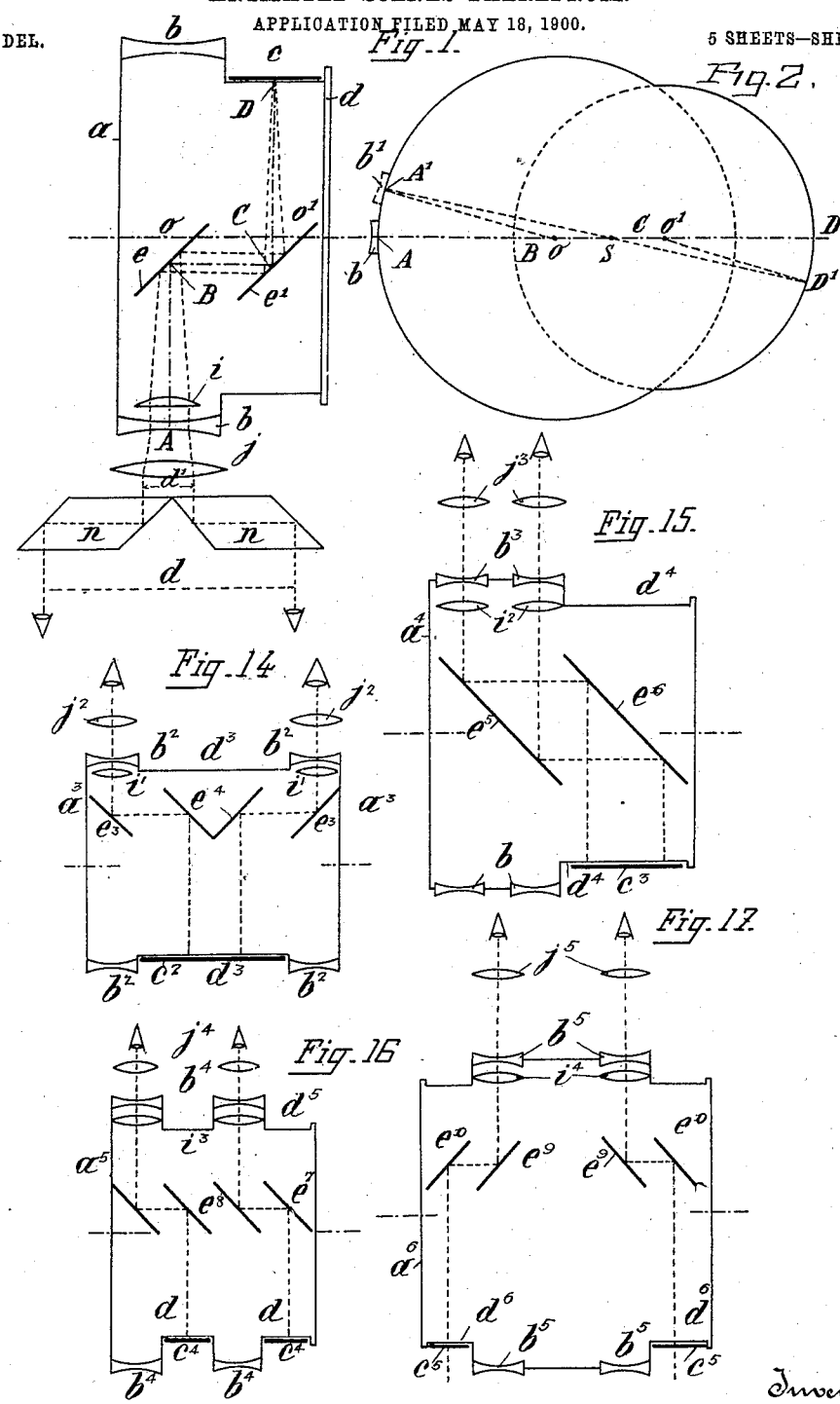

No. 721,954. PATENTED MAR. 3, 1903.
H. L. HUET & A. DAUBRESSE.
APPARATUS FOR TAKING PICTURES AND VIEWING OR REPRODUCING ANIMATED SCENES THEREFROM.
APPLICATION FILED MAY 18, 1900.
NO MODEL. 5 SHEETS—SHEET 2.
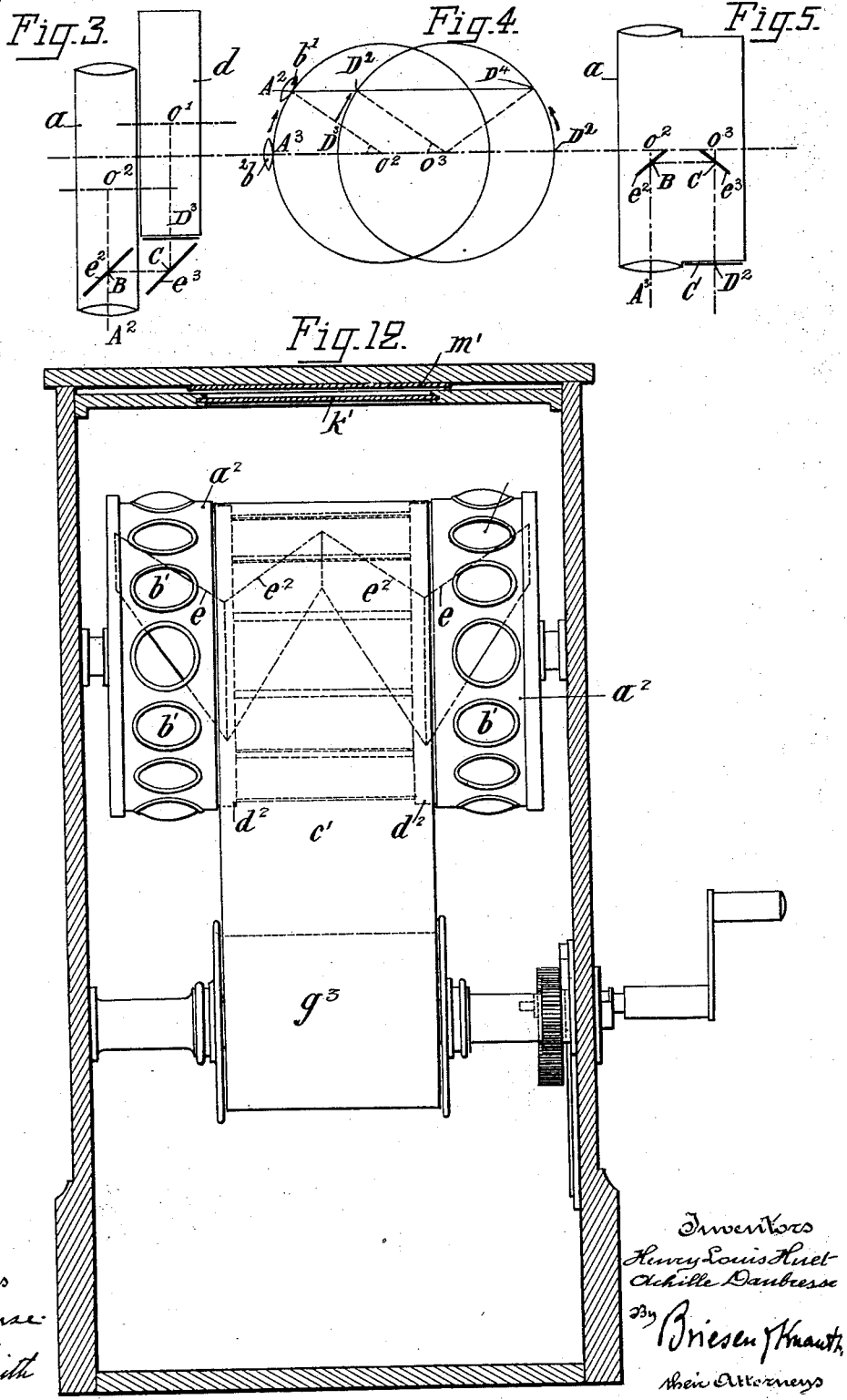

No. 721,954. PATENTED MAR. 3, 1903.
H. L. HUET & A. DAUBRESSE.
APPARATUS FOR TAKING PICTURES AND VIEWING OR REPRODUCING
ANIMATED SCENES THEREFROM.
APPLICATION FILED MAY 18, 1900.
NO MODEL. 5 SHEETS—SHEET 3.
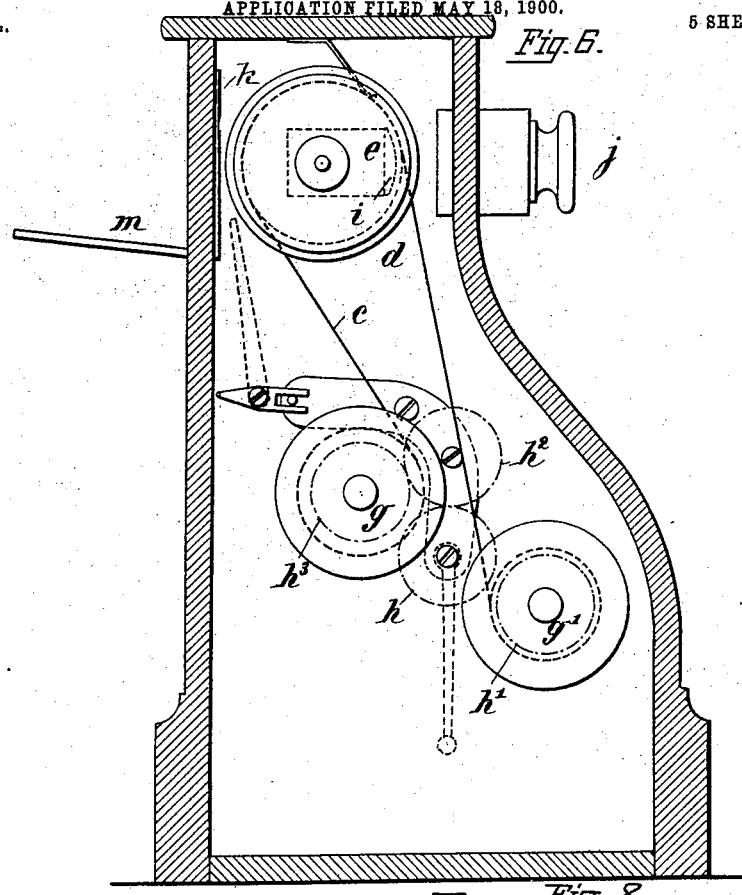
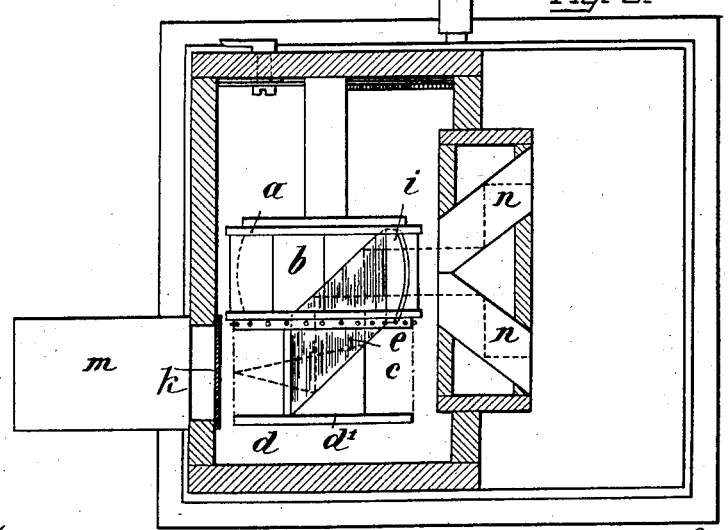

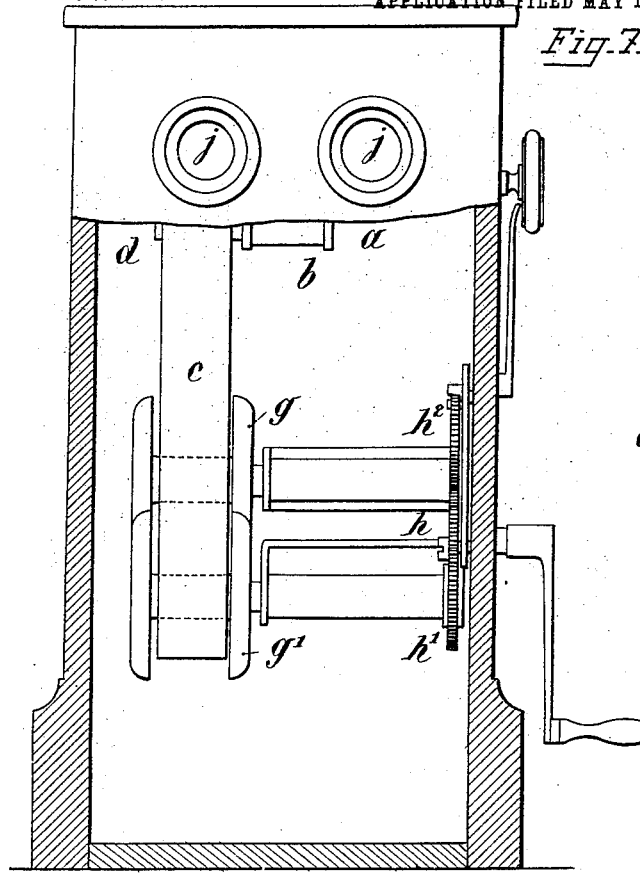
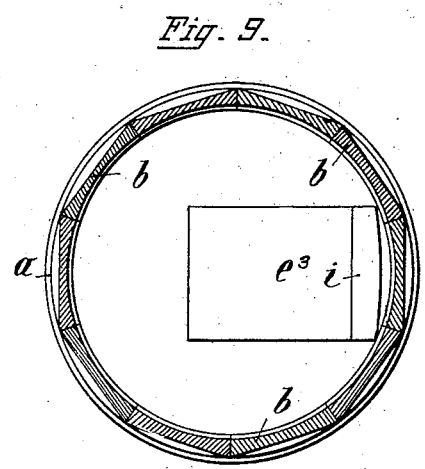
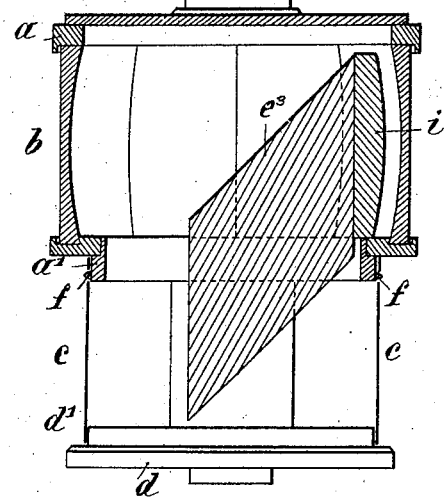
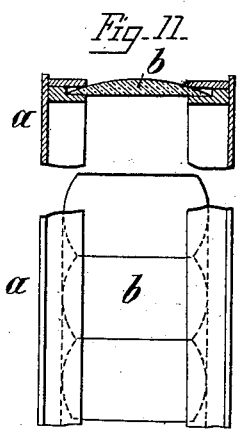

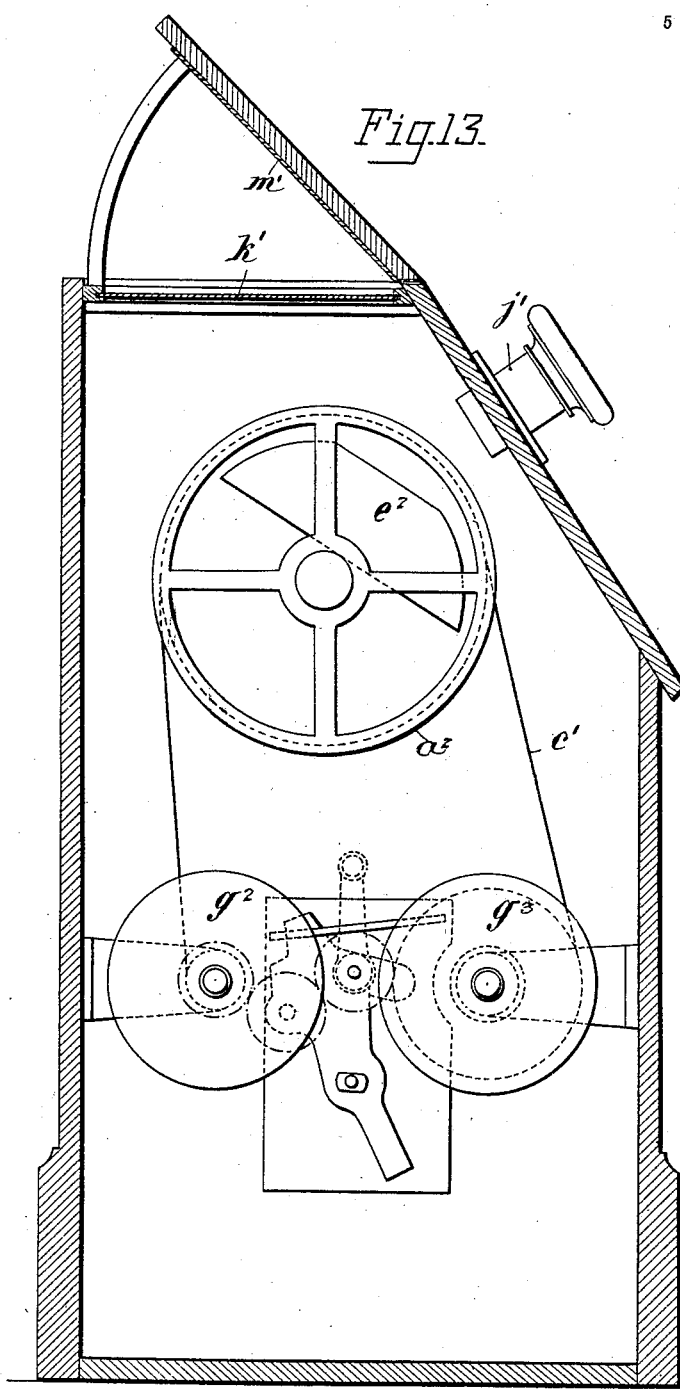

UNITED STATES PATENT OFFICE.

HENRY LOUIS HUET AND ACHILLE DAUBRESSE, OF PARIS, FRANCE.

APPARATUS FOR TAKING PICTURES AND VIEWING OR REPRODUCING ANIMATED SCENES THEREFROM.

SPECIFICATION forming part of Letters Patent No. 721,954, dated March 3, 1903.

Application filed May 18, 1900. Serial No. 17,099. (No model.)

*To all whom it may concern:*

Be it known that we, HENRY LOUIS HUET, optical-instrument manufacturer, of 114 Rue du Temple, and ACHILLE DAUBRESSE, captain of artillery, of 51 Avenue Bosquet, Paris, in the Republic of France, have invented Apparatus for Taking Pictures and Viewing or Reproducing Animated Scenes Therefrom, of which the following is a full, clear, and exact description.

This invention relates to apparatus for obtaining a fixed image from a moving photograph, engraving, or object for reproducing animated scenes. This apparatus, which is based on a totally-different optical principle from those hitherto applied in apparatus for reproducing animated scenes, is of very simple construction and possesses the advantage of obviating the necessity, as in ordinary apparatus, of masking the lens during the movement of the film or band, so that a continuity of images may be obtained without eclipse or with eclipses of indefinitely-reduced duration, these eclipses being the cause of the objectionable scintillation which occurs in kinematographic projections.

The apparatus is capable of being employed either as a chronophotographic apparatus—that is to say, an apparatus for recording movement by the successive impression of images upon the same film at very short intervals of time—or the apparatus may be employed as a kinematograph for the successive projection of the said pictures or as a kinematoscope or apparatus in which the pictures are viewed directly instead of being projected upon a screen.

The apparatus essentially comprises, first, a lens-carrying drum on which are mounted lenses juxtaposed at axial distances equal to the interaxial distance of successive pictures; second, a picture-carrying drum having the same angular velocity as the lens-carrying drum and around which passes the band bearing the pictures corresponding to the successive positions of the subject; third, a system of reflectors interposed between the two drums for successively bringing the image of each picture into the direction of the optical axis of the lens by which it is to be transmitted. These elements are arranged and combined in such manner that the several lenses form their images always at the same fixed point, which is one of two centers of similitude or homotheity of the two circumferences respectively described by the nodal point of each lens and one of the points of the picture and obtained by making a section of the apparatus along the direction of the luminous rays and developing said section on a plane. This fixed point will be the center of direct similitude when the lenses are convergent and will be the center of inverse similitude when the lenses are divergent. The lens-carrying and picture-carrying drums receive rotary motion, and if the eye or an objective be applied to the instrument the several lenses will pass in succession before the eye or the objective at the same time that the picture-carrying band is moved along, and when one lens succeeds another the image of the picture presented by said lens will occupy the exact position of the image which was presented by the preceding lens.

To obtain images at the center of inverse similitude, diverging lenses are employed, as in this case the image would be formed between the lens and the picture. On the other hand, with converging lenses the image will be formed at the direct center of similitude, since each converging lens will form its image beyond the picture. If the two circumferences respectively described by the nodal point of each lens and by a point on the picture are equal, the center of inverse similitude (diverging lenses) will be found at the mid-distance between the centers, and in order that the image produced by the lens may be formed at this point it is necessary that the picture or the image of the same transmitted by the reflector should pass through the focus of the lens. The center of direct similitude (converging lens) is, on the contrary, projected an infinite distance, and in order that the image may be formed at an infinite distance it is necessary, as before, that the picture or the image of the latter transmitted by the reflector shall pass through the focus of the lens.

The apparatus is illustrated in the accompanying drawings, wherein—

Figure 1 is a diagrammatic view of an arrangement in which diverging lenses are employed. Fig. 2 is a section of the same, taken in the direction of the luminous rays and developed on a plane. Fig. 3 is a diagrammatic view showing the arrangement with converging lenses. Fig. 4 is a section of the same, taken in the path of the luminous rays. Fig. 5 is a diagrammatic view showing a modified arrangement with converging lenses. Figs. 6, 7, and 8 represent sectional elevations at right angles and plane, respectively, of the apparatus as applied in a kinematoscope. Figs. 9 and 10 are detail views, in vertical and horizontal sections, respectively, of the lens-holding drum and reflectors. Fig. 11 is a fragmentary detail view of the lens-mounting. Figs. 12 and 13 show front and side elevations of a modified form of the apparatus adapted for use as a kinematoscope. Figs. 14 to 17 show diagrammatic horizontal sectional views of different stereoscopic forms of the apparatus.

The same letters of reference denote like parts in all the figures.

Referring to Figs. 1 and 2, the drum $a$ carries upon its periphery diverging lenses $b$, the film or band $c$ passing around a portion of the circumference of another drum $d$. The drums $a$ $d$, of which Fig. 1 shows a section in the plane of the axis, are in one and have a common axis, and they may either be of the same or of different diameters. Within the cylinders is mounted an arrangement of reflectors consisting either of two fixed parallel mirrors $e$ $e'$ or of a prism having parallel reflecting-surfaces, said reflectors having for their object to enable the optical axis of any one of the lenses after the double reflection to normally meet the picture presented to it. If a section of the apparatus be taken in the path of the luminous rays—viz., on the line A B C D—and if this section be developed on a plane, as shown in Fig. 2, it will be found that the path of the luminous rays A B+B C+C D between lens $b$ and point D of the film or band $c$ is necessarily greater than the sum of the two radii $o$ A and $o'$ D and the two centers $o$ $o'$ are not merged the one in the other, but separated by a distance equal to B C—that is to say, by the distance by which the reflectors $e$ $e'$ have shifted the optical axis. The two drums $a$ $d$ being in one have the same angular velocity, and if said drums be turned so as to bring lens $b$ to $b'$, point A to A', and point D of the film or band $c$ to point D' as points A and D had the same angular velocity it follows that the radii $o$ A' and $o'$ D' are parallel, and the secant A' D' cuts the line A D at a fixed point S, which is the center of inverse similitude. The focal length of lenses $b$ is such that the images of the pictures will be formed at the fixed point S.

The apparatus may also have converging lenses, in which case the curvature of the lenses is such that the images will be formed at the center of direct similitude of the two circumferences described, respectively, by the nodal point of each lens and a point of the picture. Figs. 3 and 4 show two diagrammatic views illustrating such an arrangement in the particular case in which the two circumferences have the same radius. The two circumferences being equal, the center of direct similitude will be projected to infinity in the direction $o^2$ $o^3$, and the right line $A^2 D^2$, which joins two simultaneous homothetic positions of the nodal point $A^2$ of the convergent lens $b^2$ and of the point $D^3$ of the picture, is parallel to the line of centers. In this case the focus of the converging lens $b^2$ should be upon the focal line $A^3 o^2$ at the point to which the image of point $D^3$ of the picture is projected by the reflectors $e^2$ $e^3$; but by reason of the parallelism of the right line $A^2 D^2$ and of the line $o^2$ $o^3$ the radius $o^3 D^4$, passing through the other point of intersection $D^4$ of the right line $A^2 D^2$ with the circumference described from center $o^3$, makes, with the line of centers, an angle $D^2 O^3 D^4$ equal to the angle $A^3 o^2 A^2$. In this case, therefore, the converging lens will have a focal length such that the focus will be at the point to which the image of point $D^2$ is projected on the axis $A^3 o^2$, Fig. 5. It is thus possible in this case to give the converging lens either the focal length $A^3 D^3$ or the focal length $A^3 D^2$ and to insure the fixity of an infinitely-distant image either of point $D^3$ or of point $D^2$ by imparting to both circumferences equal angular speeds, provided the rotations are in the same direction when the focus of the lens is at $D^3$ and in opposite directions when the focus is at $D^2$, as indicated by the arrows in Fig. 4. In the second case (see Fig. 5) the reflection would be effected by mirrors inclined at ninety degrees to each other, as in Fig. 5, or by a prism having reflecting-faces at an angle of ninety degrees. The two drums might then be in one and receive the same rotary motion, since the reflectors thus arranged produce rotation of the image of point $D^2$ in the reverse direction to that of the actual rotation of point $D^2$ itself, and therefore of point $A^3$. In the other case, Fig. 3, it will always be necessary to have two distinct drums and two different spindles rotated at equal speeds and in the same direction by means of gearing. In this case the reflecting-surfaces are parallel.

The different images of the corresponding points in successive pictures will be projected, respectively, by the several lenses always in the same direction, and as these images are formed at an infinite distance they will be superposed and remain fixed during the rotation of the drums.

Figs. 6 to 10 show the application of the apparatus for the reproduction of a scene made up of any desired number of constituent views. Upon a drum $a$ are juxtaposed lenses $b$, which may be either diverging or converging, said lenses being preferably jointed together, as shown in face view in Fig. 11, so as to avoid any eclipse. The drum $a$ has a shoulder $a'$, upon which is supported one edge of the band $c$, which carries the different constituent views, the other edge of said band being supported upon the shoulder $d'$, formed on a disk $d$. The drum $a$ and disk $d$, which are loose upon their shafts, may be either independent of each other or connected together. The picture or film carrier may also consist of a cylinder provided with openings for viewing the film lapped around it or the cylinder may be made of glass. The shoulder $a'$ has pins $f$, which engage in perforations made at regular intervals along one margin of the band $c$, and the shoulder $d'$ may or may not have similar pins. The band or film $c$ unwinds from a spool $g$ and is lapped for a greater or less arc around the shoulders $a'$ $d'$ and is wound upon a reel $g'$. A crank or clockwork imparts motion to the reel $g'$ or, preferably, to a toothed wheel $h$, capable of being thrown into gear either with a toothed wheel $h'$, keyed on the shaft of reel $g'$, or through the medium of an intermediate wheel $h^2$, into gearing with a wheel $h^3$, keyed on the shaft of spool $g$, so as to permit of the film being moved in either direction. The engagement of the film $c$ with the pins $f$ carries around the lens-carrying drum $a$, so that the latter and the film will necessarily have the same angular velocity. The circumferential length of the picture or film carrying drum should correspond to a whole number of elementary views, to each of which a lens must correspond. Within the drum is fixedly mounted a set of reflectors consisting either of two mirrors or of a prism $e^3$, the reflecting-surfaces being either parallel or perpendicular to each other, as previously described. When the lenses are divergent, the consequent diminution of the images is remedied by mounting within the lens-drum close to the ring of lenses a stationary converging lens $i$ of the same focal length as the diverging lenses. This stationary lens also serves another purpose. When diverging lenses are employed alone and revolve in front of the eye or in front of a projecting lens, the image of a given point is formed, according to the position of the lens, either by the center of the lens or by a marginal part of the lens. Now if the lens-aperture be of considerable size the spherical aberrations have for effect to modify the value of the focal length, which becomes lower at the edges than at the center, and the image of the point under observation, which would be immovable if there were no spherical aberrations, in reality makes a slight apparent movement. The effect of the stationary converging lens $i$, whose spherical aberrations are of contrary sign to those of the revolving diverging lenses $b$, is to almost perfectly correct this defect. By varying the distance between the converging lens and the ring of diverging lenses the effect of the aberrations of the one lens may be made to predominate over those of the other, this means of regulating the instrument enabling the attainment of the desired result in a precise and expeditious manner. The stationary converging lens $i$ may be cemented to the prism $e^3$, as shown in Figs. 9 and 10. The apparatus thus arranged constitutes a kinematoscope permitting of direct vision and the images appearing of unaltered dimensions if the lenses are diverging or of magnified dimensions if the lenses are converging.

In order to obtain a certain degree of enlargement in the case of diverging lenses, it is merely necessary to view the images through a fixed magnifying-lens $j$, placed outside the drum in front of the ring of lenses $b$, as in Fig. 1.

The pictures are lighted in succession as they pass in front of an opening glazed with ground glass $k$, onto which the exterior luminous rays are thrown by an inclined mirror $m$. This opening would either be made in the exterior wall of the apparatus, as in Figs. 6 and 8, or at its upper part, as in Figs. 12 and 13, in which latter case the reflectors $e'$ $e^2$ would be so inclined as to project the luminous rays in the direction of the eyepiece $j'$.

For binocular vision the apparatus is provided with two double-reflection prisms $n$, having parallel reflecting-surfaces, or with two sets of parallel mirrors, whereby the interocular distance $d$ is reduced to a distance $d'$ comprised within the lens-aperture $b$, Figs. 1 and 8.

The apparatus may also be rendered stereoscopic, so that the observer may simultaneously view two stereoscopic images side by side upon the same film or upon separate films corresponding, respectively, to the right and left eyes. This stereoscopic apparatus would be in principle a duplication of the single apparatus and would comprise two lens-rings at the interocular distance and two film-carrying drums or a single drum of sufficient breadth to carry two pictures. Thus in the construction illustrated by Figs. 12 and 13 we employ two rings $a^2$, connected to move in unison and carrying at the interocular distance lenses $b'$, disposed as hereinbefore described. The flanges or collars $d^2$ receive the picture-band $c'$, the respective ends of which are secured to the reels $g^2$ $g^3$, driven by means of mechanism of the same character as described with reference to Figs. 6 and 7. The eyepieces $j'$ and reflectors $e'$ $e^2$ have already been mentioned above. The mirror $m'$, located at the top, throws the light upon the picture-band $c$ through the ground glass $k'$. This form of the apparatus is a stereoscopic kinematoscope.

Figs. 14 and 15 show diagrammatically two modifications of the stereoscopic form of the apparatus having diverging lenses and adapted for use with either a single band or film of double width or two distinct bands or films. The construction shown in Fig. 14 has eyepieces $j^2$, a drum $a^3$ with diverging lenses $b^2$, a revoluble carrier $d^3$ for the picture-band $c^2$, stationary converging lenses $i'$, and reflectors $e^3$ $e^4$, so arranged as to direct the beams of light from the two juxtaposed portions of the picture-band $c^2$ to the eyepieces $j^2$. The carrier $d^3$ in this case is located between the two sets of lenses $b^2$. In Fig. 15 the carrier $d^4$ is located at the same side of both sets of lenses $b^3$, mounted on the drum $a^4$, and two reflectors $e^5\ e^6$ suffice for throwing the light in the desired direction from the picture-band $c^3$ to the eyepieces $j^3$, the beams passing through the stationary condensing lenses $i^2$.

For two separate picture bands or films we may employ constructions such as indicated in Figs. 16 and 17. In the former the sets of lenses $b^4$ of the drum $a^5$ alternate with the carrier $d^5$ for the picture-bands $c^4$. The light proceeds from said bands to the parallel reflectors $e^7\ e^8$, the stationary converging lenses $i^3$, and the diverging lenses $b^4$ to the eyepieces $j^4$. In Fig. 17 the drum $a^6$ is provided with two sets of lenses $b^5$ between two carriers $d^6$ for the picture-bands $c^5$. The eyepieces $j^5$ and converging lenses $i^4$ are arranged like the corresponding parts of the constructions hereinbefore described. The reflectors $e^9\ e^0$ are disposed in two sets, the reflectors of one set being parallel to each other, but at a right angle to those of the other set.

The apparatus shown in Figs. 14, 15, 16, and 17 have diverging or dispersion lenses, and in this case the reflecting-surfaces, which act conjointly for the production of either the right-hand or the left-hand image, are parallel to each other, as illustrated. Should converging or collecting lenses be employed, there should be substituted for the two sets of parallel reflectors two sets of reflectors in which each reflector is arranged at a right angle to the other reflector of the same set, as indicated in Fig. 12 for the reflectors $e'\ e^2$.

In order to form a kinematograph or apparatus for projecting animated scenes, it suffices to replace the direct-vision lens $j$ by an objective, and as when the drum carries diverging lenses the fixed virtual images given by said lenses in their rotation are formed at a finite distance the ordinary objective may be used for projection without alteration, and as, on the other hand, when the drum carries converging lenses the images are formed at an infinite distance an objective would be employed which will bring the images to a finite distance, the simplest arrangement being a tele-objective composed of a diverging and a converging element, the first being intended to bring back the virtual image to a finite distance and the second to produce a true image of the former at a finite distance. The apparatus as thus arranged for the projection of views may also be used for photographing views on the films, so as to constitute a chronophotographic apparatus, it being merely necessary for this purpose to replace the projection-objectives by a photographic objective, to add a shutter for regulating the time of exposure for each view according to the speed at which the film is unwound, and to make the apparatus lighttight. This chronophotographic apparatus may also be provided with two rings of lenses and two photographic objectives for taking stereoscopic views either upon a single film or upon two distinct films, and the apparatus may be arranged in any of the ways previously described for a stereoscopic apparatus.

It should be remarked that it is not necessary that the continuous motion imparted to the lens-carrying and picture-carrying drums should be uniform, as the images would gain considerably in sharpness if the speed be retarded at the moment each lens is coaxial with the eye-view lens or the fixed external objective or is near this position, and if, on the other hand, the movement of rotation be accelerated as the lens recedes from this coaxial position it is thus advantageous not to employ a uniform speed of rotation.

It is to be understood that any suitable means—such as a cam, eccentric, variable-friction spring, escapement eccentric-gear, &c.—may be employed to slacken or even arrest the rotation during one of its phases and accelerate it at others.

The invention may also be applied for the production of colored photographic images. If the film or band bears a succession of monochrome pictures, the reconstitution of the compound colors of the subject, either in projection or in direct vision, may be obtained by interposing in the path of the luminous rays issuing from each of such pictures a glass screen of the corresponding primary color. Similarly, the chronophotographic form of the apparatus may be used for taking monochrome negatives by the addition of a device whereby colored-glass screens of each of the elementary colors selected will be interposed successively in the path of the luminous rays.

We claim—

1. An apparatus for producing stationary images representing animated scenes, comprising, in combination, a film-carrying drum mounted to revolve; a lens-carrying drum adjacent to the film-carrying drum and mounted to turn therewith, the lenses carried by the last-named drum adjacent to its periphery being plano-concave divergent lenses; a stationary double-reflection system comprising two plane parallel surfaces placed within the said drums and arranged to so deflect the luminous rays that the incident ray will be parallel to the final reflected ray, and a stationary convergent lens arranged within the lens-carrying drum adjacent to the lenses thereof and in the path of the luminous rays, whereby a practically absolute steadiness of the image is obtained.

2. The combination of a rotary drum adapted to receive a picture-band upon its outside, and a stationary light-directing device located interiorly of the picture-band-receiving portion of the drum, said device comprising two parallel reflecting-surfaces facing each other and arranged at an angle of forty-five degrees to the axis of rotation of the drum whereby the rays of light will be caused to cross the axis of the drum and also to be deflected or shifted longitudinally thereof.

3. The combination of a rotary drum adapted to receive a picture-band, a stationary light-directing device located interiorly of the drum, said device comprising two reflecting-surfaces facing each other and arranged at an angle to the axis of rotation of the drum at different points of said axis so that the rays of light will by reflection be shifted lengthwise of said axis, a series of lenses held to rotate with said drum and arranged to receive the reflected rays from said light-directing device, and a stationary convergent lens arranged within the series of rotating lenses and in the path of the reflected rays of light.

The foregoing specification of our improved kinematoscopic, kinematographic, chronophotographic, and chromophotographic apparatus signed by us this 2d day of May, 1900.

HENRY LOUIS HUET.
ACHILLE DAUBRESSE.

Witnesses:
EDWARD P. MACLEAN,
MAURICE H. PIGNET.